United States Patent [19]

Janz

[11] Patent Number: 5,014,878

[45] Date of Patent: May 14, 1991

[54] FLEXIBLE CUP DISPENSING APPARATUS

[76] Inventor: Ronald J. Janz, 3215 S. 95th St., Milwaukee, Wis. 53227

[21] Appl. No.: 332,696

[22] Filed: Apr. 3, 1989

[51] Int. Cl.[5] .......................... A47F 1/04; B65G 59/10

[52] U.S. Cl. ...................................... 221/279; 221/308; 221/310

[58] Field of Search ............... 221/304, 307, 308, 310, 221/279

[56] References Cited

U.S. PATENT DOCUMENTS

| | | | |
|---|---|---|---|
| 1,058,787 | 4/1913 | Nias | 221/308 |
| 1,131,255 | 3/1915 | Luellen | 221/310 X |
| 1,388,977 | 8/1921 | Stephens | 221/310 X |
| 3,108,714 | 10/1963 | O'Brien | 221/308 X |
| 3,211,329 | 10/1965 | Boyd | 221/308 X |
| 3,315,842 | 4/1967 | McGurk | 221/310 |

*Primary Examiner*—F. J. Bartuska

*Attorney, Agent, or Firm*—Andrus, Sceales, Starke & Sawall

[57] ABSTRACT

A cup dispenser for accommodating conically shaped cups of different diameters includes a discharge unit having multiple diaphragms. An outer diaphragm has a series of inwardly extending circumferentially spaced flat fingers for gripping the outer surface of the cup. An inner diaphragm is similarly constructed. The circumferentially spaced flat fingers of the inner diaphragm differ in length one from the other, all of the inner diaphragm fingers being shorter than the outer diaphragm fingers. Preferably, the inner diaphragm is constructed to provide a series of fingers having a first length arranged alternately with a series of fingers having a second, shorter length. The outer diaphragm fingers resiliently grip the outermost cup to require positive pulling of the cup from the dispenser. The inner diaphragm fingers engage the larger end of the stacked cups as the outermost cup is pulled therefrom, to retain the stack within a tubular cup support.

11 Claims, 4 Drawing Sheets

FLEXIBLE CUP DISPENSING APPARATUS

BACKGROUND OF THE PRESENT INVENTION

This invention relates to a flexible cup dispensing apparatus and particularly to the successive dispensing of nested, tapered cup-shaped articles such as plastic and paper disposable drinking cups and the like.

Disposable cups are used in homes, offices, factories and other environments. The cups are formed of paper, plastic and the like with a bottom wall and a tapered or conical sidewall to a top opening which may or may not have a lip structure. Generally, in paper cups, the upper end is formed with a rolled end. Plastic cups are often formed without a rolled end but have a slightly thicker open end than the principal portion or body of the cup. The cups are relatively flexible and stored in a telescoped stack of cups. Various holders for holding a stack of cups have been provided with a bottom opening for withdraw of the lowermost cup. For example, U.S. Pat. No. 3,315,842, which issued Apr. 25, 1967, discloses a cup dispenser consisting of a tubular housing within which the stack of cups are disposed. The bottom opening through which the cups protrude and are discharged include a plurality of inwardly projecting tabs which extend longitudinally and slightly inwardly to define an opening for the cups. The length of the tabs within the housing are varied to provide a successive holding action on the cups. Thus, as the first cup is pulled downwardly, all tabs flex outwardly. The shorter tab however is released and springs inwardly prior to the complete removal of the cup to exert a restraining force on the next adjacent cup and to hold it in position. The shorter tabs then supports the stack of cups within the tubular dispenser while the lowermost cup is completely withdrawn through the extended tabs or fingers. A somewhat similar structure is also shown in the U.S. Pat. No. 1,058,787, which issued Apr. 15, 1913, which discloses a plurality of circumferentially distributed fingers having curved portions adapted to provide engagement with successive lips in the stack of cups. A further cup dispenser is shown in U.S. Pat. No. 3,211,329 which issued Oct. 12, 1965. In this latter dispenser, the tubular member terminates in a bottom opening which is partially closed by horizontally extended fingers. The tongues as shown as generally frusto-conically shaped and project inwardly on a common circle. Generally, a pair of the tongues of essentially identical length are provided. The difference in the length of the tongues is on the order of 1/16th of an inch. The design is specifically for the paper-type cup having an encircling upper lip and with the cups in the stacked relation having the lips spaced slightly from each other. As the cup is pulled through the horizontally projecting lips, the slightly extended tongue grasps the side of the unit and the innermost tongue underlies the lip to support the stack of cups. With larger cup sizes, the tongues deflect downwardly into spaced holding engagement, with the innermost tongue again engaging the lip to support the stack. To withdraw the lowermost cup, one grasps the protruding lower cup portion and pulls downwardly. This results in a continued deflection of all tongues until the cup is released. On the larger cups, the patent structure relies on the engagement with the sidewall with the uppermost unit providing a flexible engagement with the sidewall of the enlarged lip. The close spacing of the edges permits the retention with the very resilient and deflectable lips which move through a relatively large angle without requiring a permanent set.

Although these and similar other devices are disclosed in the prior art, there is a need for a cup dispenser which will accommodate a wide range of different types and sizes of cup units from a standard dispensing unit in order to produce an effective low cost and universal type of an application. This is particularly true because of the advanced stage of the dispensing art where widely different sized cups are required at each installation. For example, in service stations and minute shopping units and the like, coffee and soft drinks are often dispensed with the size or quantity varying between relatively small cups of eight ounces or less to relatively large cups of thirty-two ounces. Further, from one installation to another, the cup size may vary from an opening of slightly over two inches to cups having top openings of four inches or more. Further, the cups may be formed of waxed paper, heat resistant paper, thin plastic, styrofoam plastic and the like. To provide a universal dispenser for all such cup varieties, the demands require very special consideration of the means to hold and support the cup structures.

SUMMARY OF THE PRESENT INVENTION

The present invention is directed to a cup dispenser adapted to accommodate a wide variety of conically shaped cups having widely differing diameters. Generally, in accordance with the present invention, a tubular cup support includes a multiple diaphragmed discharged unit including at least a first flat outer diaphragm unit having a plurality of first circumferentially spaced flat fingers for resilient gripping of all cups to require positive pulling of a cup from the dispenser in combination with a second inner flat diaphragm unit having a plurality of flat fingers of substantially) different lengths and being circumferentially spaced. The inner flat fingers serve to engage the large end of different sizes of stacked cups as the outermost or exposed cup is pulled from the stack to firmly support the stack within the tubular cup support.

In a preferred practical construction, the diaphragm discharge unit includes a pair of flat, plastic diaphragms. The outer plastic diaphragm has a plurality of plastic flat fingers projecting inwardly and essentially the same length to define a minimum opening smaller than the minimum cup diameter. The inner plastic diaphragm includes a plurality of plastic flat fingers significantly shorter than fingers of the outer diaphragm and including fingers significantly of different lengths related to the different diameters of different sized cups which are to be housed and dispensed from the dispenser. Each finger is formed of sufficient width to form a flexible finger of sufficient strength to provide support of the cups in the operation of the dispenser. In certain applications and depending on the characteristic of the diaphragm units, the outer diaphragm/may be formed as a dual diaphragm unit with fingers of slightly different lengths to effectively stiffen the fingers. In the preferred and particularly practical construction, the same number of fingers are formed in two flat plastic diaphragms, with outer constant length fingers of the outer diaphragm aligned with the varying length fingers of an inner diaphragm. Each finger is a generally rectangular shaped member having a significant width and projecting inwardly from an outer integral annular portion. The diaphragms are clamped to a rigid mounting ring unit which is releasably coupled to a tubular housing. A spring loaded guide unit is located within the housing and projects into the innermost cup to establish a guided loading of the stack of cups urging the stack outwardly of the housing through the special multiple diaphragm units. The housing can be oriented in any desired position including a vertical or horizontal position. The housing diaphragm cup guide member may be molded plastic members.

The present invention has been found to provide a cup dispenser which can accommodate a wide variety of the conically shaped nested cups which differ not only in material but in different sizes and particularly different diameters.

DESCRIPTION OF THE DRAWING FIGURES

The drawings furnished herewith illustrate a best mode presently contemplated for carrying out the invention as more fully described hereinafter.

Figure 2:
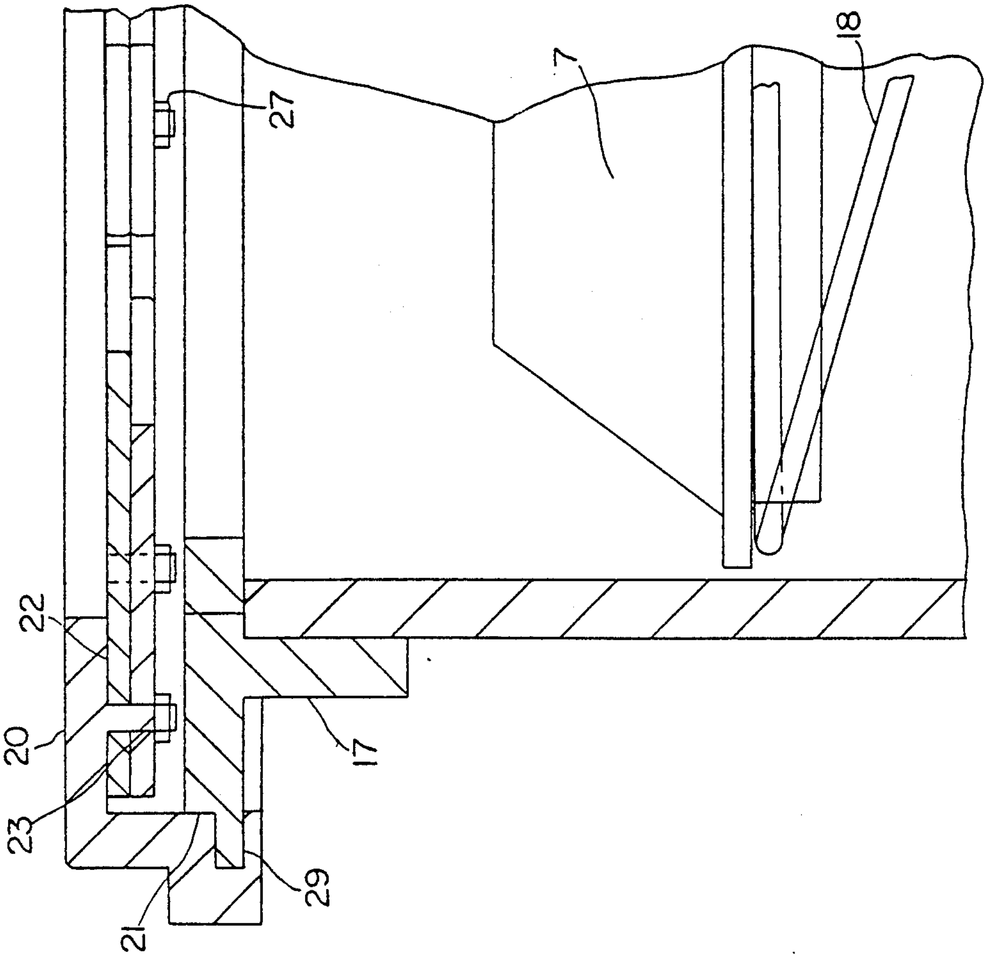
FIG. 2 is an enlarged fragmentary sectional view illustrating a diaphragm unit of the present invention.
Figure 2A:
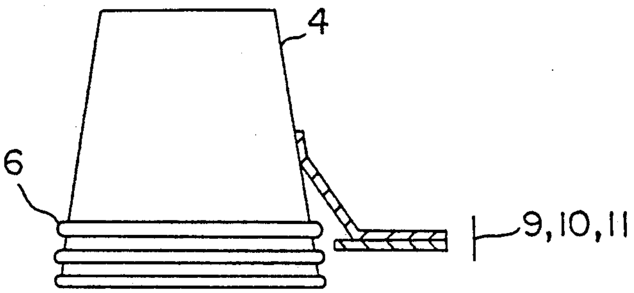
Figure 2B:
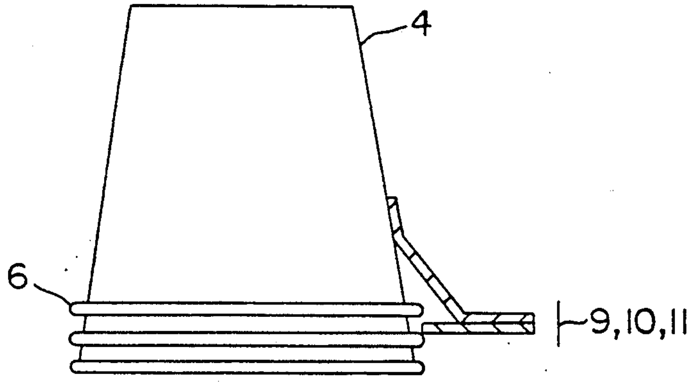
Figure 2C:
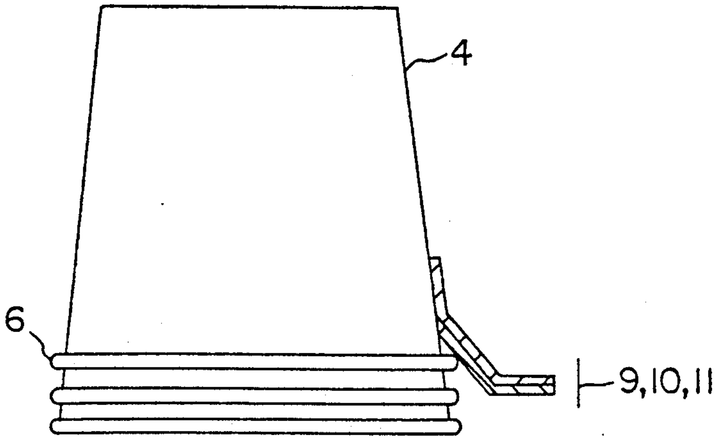
Figure 3:
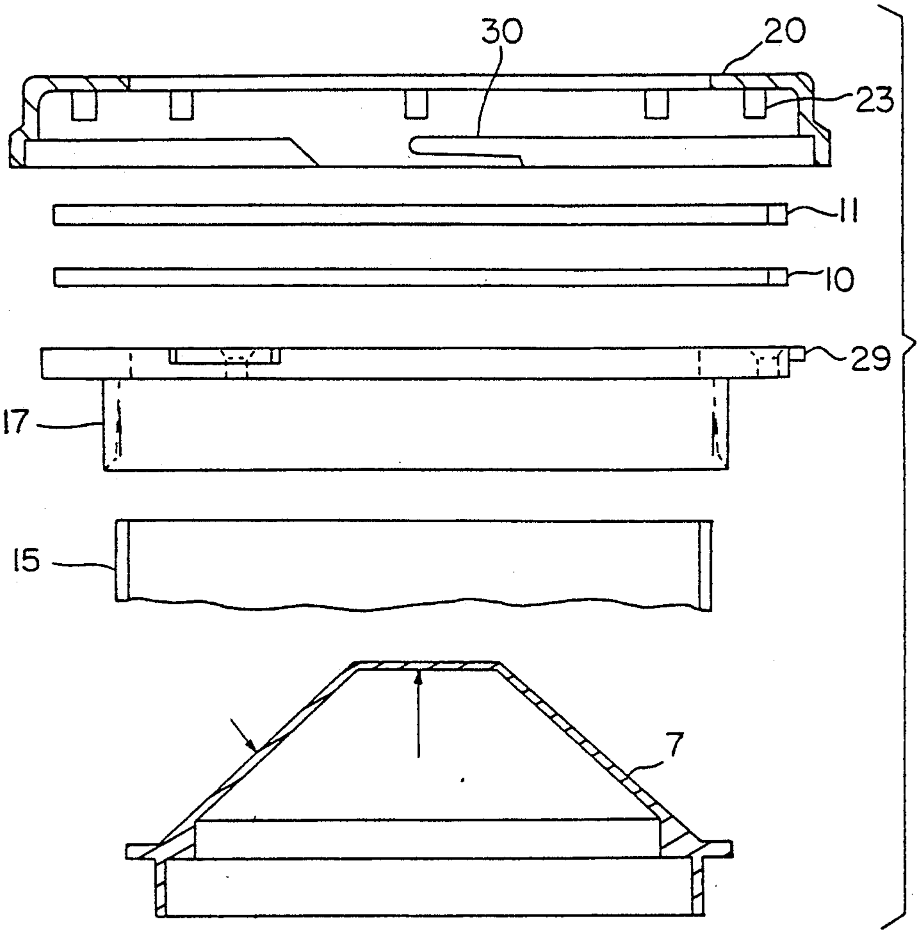
Figure 4:
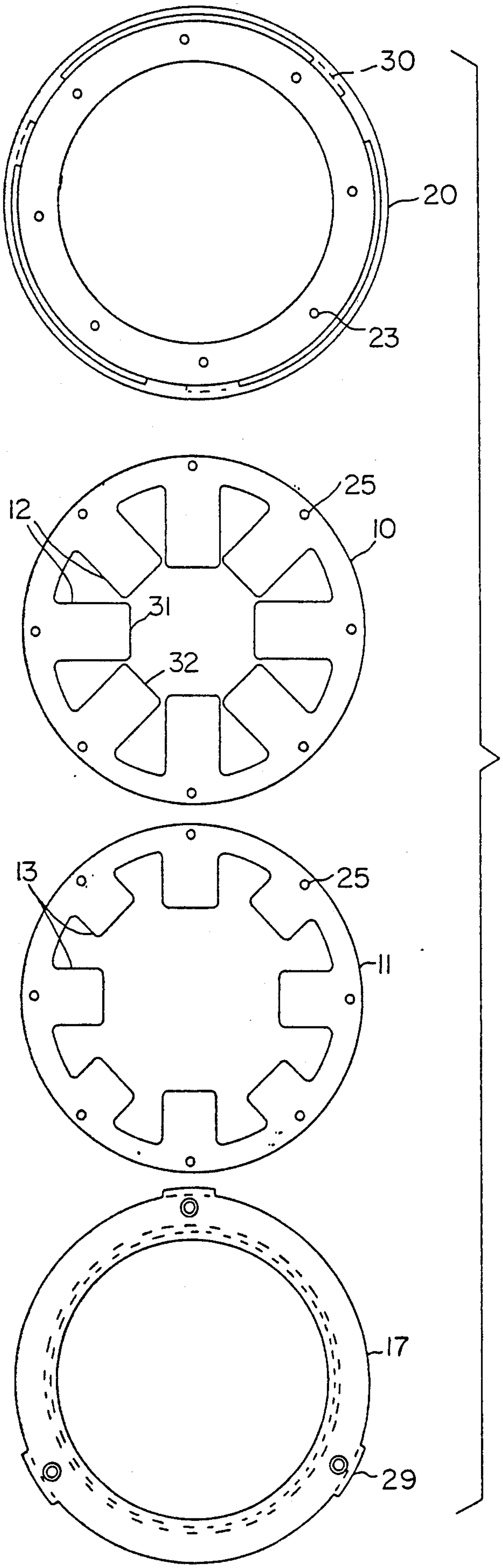

FIG. 2*a* is a view similar to FIG. 2 with a small cup located therein;

FIG. 2*b* is a view similar to FIG. 2 with a medium cup located therein;

FIG. 2*c* is a view similar to FIG. 2 with a large cup located therein;

FIG. 3 is an exploded side elevational view illustrating a diaphragm unit;

FIG. 4 is an exploded plan view of the diaphragm unit components; and

Figure 5:
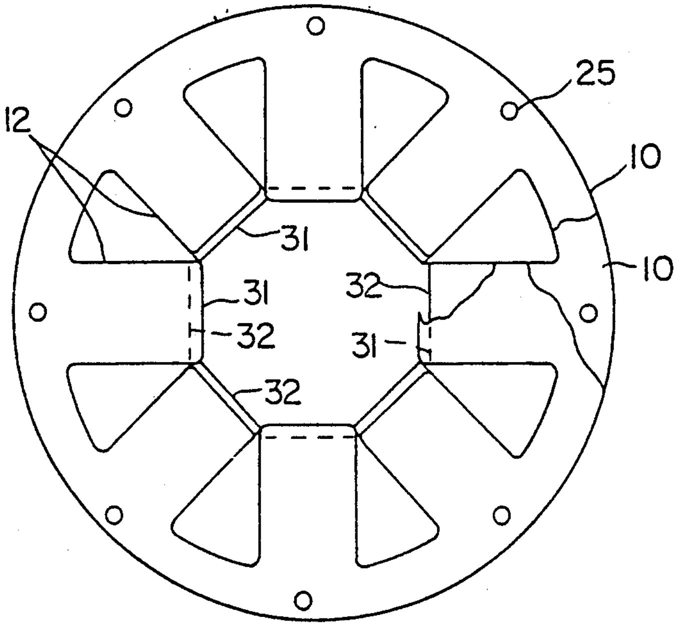

FIG. 5 illustrates a modification to the structure of the first embodiment.

DESCRIPTION OF THE ILLUSTRATED EMBODIMENT

Figure 1:
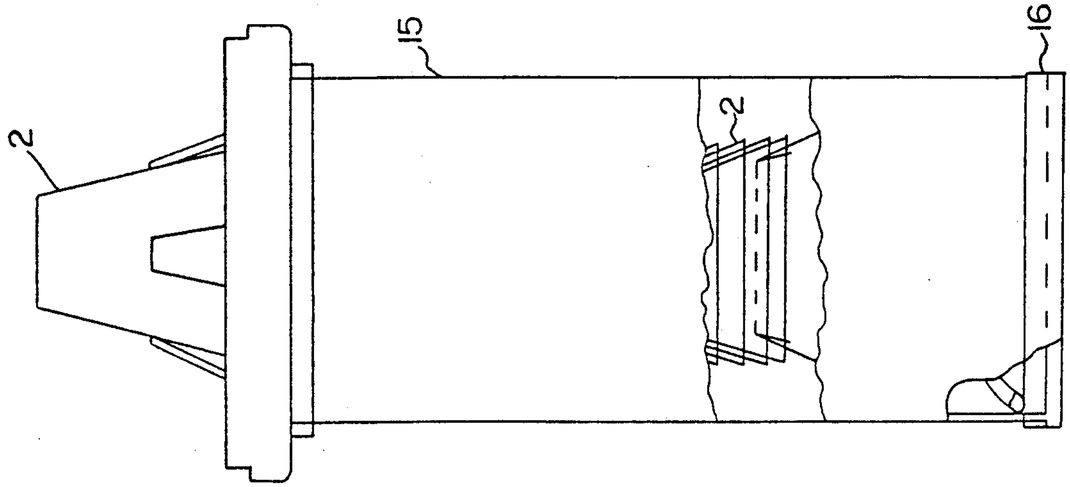
FIG. 1 is a side elevational view of a cup dispenser.

Referring to the drawings and particularly to FIGS. 1 and 2, a cup dispenser 1 is illustrated within which a stack of cups 2 are supported, with the lowermost cup projecting downwardly through an end opening 3 in the bottom of the dispenser 1. The illustrated cups 2 are of a well known design and construction and include a frusto-conical body 4 formed of a significantly resilient sidewall and an upper top opening 5. The sidewall 4 of the cup as illustrated is typical of cups formed of styrofoam and includes a band-like enlargement 6 of a slight extension at the open end and defining a slight lip at the opening. A spring-loaded cup guide member 7 engages the open end of the innermost cup 2 and resiliently urges the stack of cups outwardly from the dispenser to permit any desired orientation of the dispenser. Although shown as a vertically oriented dispenser with the cups 2 dispensed through the bottom opening, the dispenser can be mounted in a horizontal or even an inverted position with the stack of cups projecting outwardly of the open end of the diaphragm for appropriate manual removal. Generally, spring-loaded cup dispensers are known in the prior art. The present invention is particularly directed to a unique controlled multifinger diaphragm structure or unit 9 secured to the open end of the dispenser 1 and providing for successive dispensing of cups 2 by pulling outwardly on the body portion 4 and providing a single unit which can operate with a wide variety of sizes and types of cups.

Generally in accordance with the present invention, the diaphragm 9 includes a stacked assembly of multiple fingered diaphragms 10 and 11 which are secured in stacked abutting relation at the open end of the dispenser. Each diaphragm 10 and 11 is generally similarly formed. Diaphragm 10 has a plurality of inwardly projecting flat fingers 12 and diaphragm 11 has a similar plurality of inwardly projecting flat fingers 13. The multiple fingers 12 and 13 of the diaphragms 10 and 11 are formed with significantly different lengths with the fingers 12 substantially longer than any finger 13.

In the illustrated embodiment, the outermost diaphragm 10 includes fingers 12 of a common length which are circumferentially shaped and define a minimum diameter opening. Thus, the cups 2 used with the dispenser have an open end diameter in excess of the diameter established by the outer diaphragm unit 10. The inner diaphragm unit 11 has the fingers 13 of a significantly different shorter length from that of the outer diaphragm fingers. The inner diaphragm fingers 13 are also circumferentially oriented around the opening but have sets of different lengths from each other.

The combination of the outer constant diameter fingers 12 with the overlying aligned inner diameter fingers 13 of different lengths provide a unit which can accommodate a wide range of different diameter cups and particularly having cups with widely varying diameters or openings and of different material. Thus, for example, in a practical construction of the present invention, cups varying with an open end are between somewhat greater than two inches to approximately four inches or more. Further, the same dispenser has been applied to cups formed from the various papers and plastics including both styrofoam and polyethylene cups.

In operation, the relatively long diaphragm fingers 12 of the outer diaphragm unit 10 provide highly flexible finger structures which readily, in accordance with the requirements of different sized cup structures, accommodate the various diameter and material of the cups with a differing deflection regardless of the size at the open end. The multiple length flat fingers 13 of the inner diaphragm 11 move into supporting engagement with the cups of a corresponding diameter for the widely varying sizes; for example, as shown in FIGS. 2 and 5.

In the illustrated embodiment of the invention, the diaphragms 10 and 11 are formed from a plastic sheet-like material having significant resiliency but of sufficient stiffness to support the stack of cups. The fingers 12 and 13 are individually formed as relatively rectangular members secured to an encircling annular frame portion and project inwardly therefrom. The outer ends are shown having a square configuration with rounded corners. With the deflection, the central portion of the fingers engage the cup and provides firm supporting engagement therewith. The lateral rounded ends are spaced slightly from the surface of the cup, with the engaging width providing firm but gentle engagement of the cup sidewall.

The relatively short fingers of the inner diaphragm provide effective engagement with the cup adjacent the cup being removed, and with the underside of lip 6 if present, to provide support of the stack against the force of the spring loading and the withdrawal of the outermost and exposed cup 2. As the diameter of the cup 2 increases, the inner shorter fingers 13 are deflected until the shortest of the fingers 13 provide the necessary effective engagement with the cup stack including underside of an existing cup lip. The fingers 13 of the inner diaphragm which define an opening greater than the size of the cup opening are spaced outwardly of the cup and remain in the inactive horizontal state or position, as shown in FIG. 2*a*.

More particularly in the illustrated embodiment of the invention, the dispenser includes a housing or casing 15, which is an elongated tubular member. The housing 15 is shown as a molded member having a diameter somewhat greater than the maximum diameter of the cup 2 to be housed within the dispenser 1. The sidewall may be provided with suitable mounting elements, not shown, for securing of the unit in a desired orientation, shown in the vertical position. The outer end of the housing is shown closed with a secured cup 16 but may be in any suitable manner.

A bottom mounting plate 17 is secured to the cup discharge end of the housing and defines a somewhat reduced opening. The plate 17 may be welded or adhesively secured to the end of the housing 15, or otherwise firmly attached to form an integrated part thereof. A large coil spring 18 having a plurality of spaced convolutions is supported within the housing members. The coil spring 18 acts between the outer cap 16 and the cup-guide member 7.

The cup-guide member 7 is shown as a generally cone-shaped member having a smooth rounded end projecting into the innermost cup 2 of the stack. Guide member 7 projects into the innermost cup and provide a guided force on the stack of cups urging the cups outwardly through the discharge of the housing and the diaphragm assembly or unit 9.

In the illustrated embodiment of the invention, the diaphragm unit 9 is releasably secured to the bottom plate or flange 17.

As most clearly shown in FIGS. 2–4, the illustrated diaphragm assembly or unit 9 is a sandwich-type construction including an outermost cup-shaped plate or cover 20 releasably secured to the flange 17. The stacked diaphragms are clamped to the inner surface of the cover 20 with the circumferentially spaced fingers projecting inwardly in coplanar relationship in the absence of the stack of cups 2. In the illustrated embodiment of the invention, eight fingers are provided on each diaphragm. Each diaphragm is shown formed from a single plastic member with an annular connecting ring or portion 21 integrally connecting the individual fingers 12 and 13 in the respective diaphragm unit 10 and 11.

The cover 20 is formed with the flat base 22 having eight posts 23 projecting upwardly within an encircling sidewall 21. Diaphragms 10 and 11 are formed with eight equicircumferentially spaced holes 25 which mate with posts 23. The posts and holes are oriented to locate the diaphragm with respective fingers 12 and 13 located in the superimposed location within the cover and flange opening. A clamping ring 26, not shown, overlies the diaphragm, but may be eliminated. Suitable clamping nuts 27 are pressed onto the posts 23 to firmly lock the diaphragm in planar abutment and projecting radially into the cup discharge opening.

The cover 20 is released to the flange 17 by circumferentially spaced bayonet connection units 28. Three units 28 are shown. Each unit 28 includes an integral small radial tab 29 on the flange 17 and a notched slot 30 in the cover sidewall 24. With the notch position aligned with the tabs 29, the cover telescopes over the flange 17 into alignment with the slots 30, and twisting and turning of the cover releasably locks the cover 20 to the flange with the fingers 12 and 13 properly located overlying the discharge opening.

In the illustrated embodiment, each diaphragm includes eight fingers.

Referring to FIG. 4, the outer diaphragm 10 is shown in plan view. The diaphragm 10 includes the eight fingers 12. Four of the fingers 31 of the fingers 12 are equicircumferentially spaced at ninety degrees relative to each other. The fingers 31 are of the same length. Four fingers 32 of fingers 12 are equicircumferentially spaced between the fingers 31. The fingers 32 are slightly less in length than fingers 31, and typically are approximately ⅛ of an inch shorter. The differential finger lengths are provided for special assembly of a diaphragm unit, as hereinafter described, for particularly small diameter cups. The fingers 31 and 32 may, for example, be approximately 2 ¼inch in length with a width slightly less than ⅛ of the circumference passing through the outer rounded corners of the fingers.

The inner diaphragm 11 is similarly formed with eight fingers 13 of a substantially shorter length than the fingers 12. In addition, the fingers 13 paired on diametrical sides of diaphragm 11 are of the same length but the offset pairs are of significantly different lengths relative to each other. Generally, the fingers 13 may have lengths 1 ½ inches to less than 1 inch, and a width substantially the same as the fingers 12. As previously described, the diaphragms 10 and 11 are mounted with the fingers 12 and 13 in superimposed alignment. The longer fingers 12 of diaphragm 10 are deflected by the projecting exposed cup 2 with the extent of the deflection related to the size of the cup. The fingers 13 of the inner diaphragm 11 may or may not be deflected. Thus, the fingers 13 are shortened to a particular standard sized cup 2, such as are commercially used in the United States and elsewhere. If the cup 2 is larger than the longest part of fingers 13, such fingers are deflected. Generally, at least one set of fingers engage the cup with no or minimal deflection and serve to support the next cup 2 adjacent the cup being removed and prevent movement of the cup stack through the diaphragm opening.

The present invention with the stacked fingers of substantially different lengths and particularly with the extended width has been found to provide a gentle but firm support of the cups 2 within the dispenser 1. The various components of the dispenser are readily constructed at a reasonable cost using present day technology and materials.

With the smaller commercially used six ounce cups, the system has been found to malfunction with the coil spring forcing cups from the dispenser. The plastic diaphragm 10 and particularly the longer fingers 12 tend to set in the deflected position with time and thus will not return to the desired holding position. Under practical application in commercial usage, the time element may be such as to create such an undesired state. The problem is solved by increasing the stiffness of the fingers. Although the diaphragm 10 could be formed with a greater thickness, this would require a separate and different diaphragm. In the preferred system, a pair of diaphragms 10 are mounted in superimposed stack relation but with the two diaphragms rotated relative to each other by 45 degrees, as shown in FIG. 5. The slightly different length of the fingers 31 and 32 allow the longer fingers to properly function in support of the cup stack and the individual removal of the cups 2, while increasing the stiffness of the fingers and preventing the above described adverse functioning of the dispenser.

Although described in multiple diaphragm dispensers, any plurality of diaphragm may be used with the appropriate fingers depending upon the diaphragm material, thickness, stiffness and the like.

The present invention thus creates an improved, cost efficient cup dispenser for dispensing of various sized cups and of cups formed of different materials.

Various modes of carrying out the invention re contemplated as being within the scope of the following claims and particularly pointing out and distinctly claiming the subject matter which is regarded as the invention.

I claim:

1. A cup dispenser for accommodating of a wide variety of cups having different diameters, comprising a tubular support unit for containing a stack of nested cups and having a discharge opening, a diaphragmed discharge unit secured to said support unit overlying said discharge opening, said discharge unit including an outer diaphragm unit and inner diaphragm unit, said outer diaphragm unit including a plurality of flat diaphragm fingers circumferentially spaced and having a substantially constant radial length projecting inwardly from an outer annular support and defining a plurality of flexible fingers for engaging the outermost cup of the stack of cups for all the different diameter of cups, and said inner diaphragm unit including a plurality of flat diaphragm fingers circumferentially spaced and having a length substantially less than the fingers of said outer diaphragm unit and said fingers of said inner diaphragm unit being of a substantially different lengths to accommodate and engage cups of widely differing diameters and thereby support the stack of nested cups during withdrawing of the outer cups.

2. The cup dispenser of claim 1 wherein said outer diaphragm unit is a single plastic element having said fingers integrally connected by an outer mounting portion, said inner diaphragm unit is a single plastic element having said fingers integrally connected by an outer mounting portion, a securement unit releasably secured to the support unit, means securing the outer mounting portions to said securement rings with said finger located in superimposed relation.

3. The cup dispenser of claim 2 wherein said support unit includes a tubular housing having an opening end, said housing and said securement unit including complementing securement elements for releasably connecting the securement unit to the housing with said diaphragm overlying said opening, and a resiliently loaded unit within the housing for urging a nested stack of cups through said opening.

4. The cup dispenser of claim 1 wherein said outer and inner diaphragm units have said fingers in superimposed and abutting relation, each of said fingers being substantially rectangular in configuration and circumferentially spaced from each other by similar shaped gaps, and said outer diaphragm unit having said fingers with minimizing gaps to create a substantially continuous engaging surface.

5. The cup dispenser of claim 1 wherein said support unit includes a tubular housing having an open end having circumferentially spaced projection, a ring member having slots releasably engaging said projection to secure the ring to the housing, and connecting elements securing said diaphragm units to said ring member.

6. A cup dispenser, comprising a housing receiving a stack of tester cups and having an opening for successive discharge of said cups, an inner diaphragm, an outer diaphragm abutting said inner diaphragm and secured to said housing overlying said opening, said outer diaphragm including a plurality of circumferentially spaced coplanar fingers of substantially the same length, said coplanar fingers projecting inwardly from the housing and being deflectable by said stack of cups to expose an outermost cup of said stack, said fingers defining a minimum opening to accommodate and continously engage different diameter cups, said inner diaphragm having a plurality of coplanar fingers projecting inwardly from said housing and being deflectable by said stack of cups, said fingers of said inner diaphragm being substantially shorter than said fingers of said outer diaphragm and being of substantially different lengths to provide engagement with different sized cups and thereby support the stack of nester cups during withdrawing of the outer cups.

7. The cup dispenser of claim 6 wherein inner and outer diaphragms have the same number of fingers and said diaphragms are oriented to align said fingers, each of said fingers having a substantially rectangular configuration and located to establish a substantially continuous engaging surface.

8. The cup dispenser of claim 6 wherein said diaphragms are flat plastic sheet-like members having an outer mounting portion and integral fingers projecting substantially radially from the mounting portion.

9. The dispenser of claim 6 wherein said outer diaphragm is formed with two sets of circumferentially spaced fingers of slightly different lengths, and including a third diaphragm interposed between said inner and outer diaphragms, said third diaphragm constructed as a duplicate of said outer diaphragm and being rotated to align the set of shorter fingers of the third diaphragm with the set of longer fingers of the outer diaphragm and with the set of longer fingers of the third diaphragm with the set of shorter fingers of the outer diaphragm.

10. The dispenser of claim 6 wherein said housing is a cylindrical member, a diaphragm cover including an annular base and a sidewall, said cover mounted over the end of the housing with the sidewall telescoped over the housing and releasably secured to the housing, said diaphragms each having an annular mounting portion stacked to said base, said base having a plurality of circumferentially spaced posts, said mounting portions have correspondingly spaced openings with the openings on the posts locating the fingers in said superimposed alignment, and a clamp element on the post to secure the diaphragms in place.

11. The dispenser of claim 10 including a mounting flange secured to the cup discharge end of the housing, said flange telescoped into engagement with the sidewall, said flange and sidewall having a plurality of bayonet connections releasably connecting the cover to the flange and thereby to the housing, said cover being connected and released by relative rotation of said cover and said housing.

* * * * *